United States Patent

Shah

[15] 3,655,338
[45] Apr. 11, 1972

[54] CENTRIFUGAL FILTRATION OF MAGNESIUM SULFITE SLURRIES

[72] Inventor: Indravadan S. Shah, Forest Hills, N.Y.

[73] Assignee: Chemical Construction Corporation, New York, N.Y.

[22] Filed: June 10, 1970

[21] Appl. No.: 45,254

[52] U.S. Cl. .................................23/129, 210/71, 210/73, 210/78
[51] Int. Cl. ...................................................C01d 5/16
[58] Field of Search ...............23/129, 131, 132; 162/36; 210/66, 67, 68, 73, 78, 380, 71

[56] References Cited

UNITED STATES PATENTS

| | | | |
|---|---|---|---|
| 2,914,518 | 11/1959 | Cottle | 210/73 X |
| 3,273,961 | 9/1966 | Rogers et al. | 23/131 |
| 3,276,994 | 10/1966 | Andrews | 210/73 X |
| 3,407,934 | 10/1968 | Ejefors | 210/73 |

*Primary Examiner*—Samih N. Zaharna
*Attorney*—J. L. Chaboty

[57] ABSTRACT

Magnesium sulfite slurry, derived from the scrubbing of a waste gas stream for sulfur dioxide removal with a circulating aqueous magnesium oxide-sulfite slurry, is processed to recover a solids cake rich in magnesium sulfite which may be subsequently calcined. The aqueous magnesium sulfite slurry is passed through a thickener so as to decant clear liquor, and the thickened slurry is heated to convert magnesium sulfite hexahydrate to the trihydrate form. The slurry is then passed through centrifugal separation means under controlled conditions of feed rate, initial total solids content and speed in revolutions per minute (rpm) of the centrifuge, so as to produce a residual wet solids cake with a moisture content of less than 5 percent by weight and an aqueous solution phase containing less than 1 percent residual solids by weight.

6 Claims, No Drawings

CENTRIFUGAL FILTRATION OF MAGNESIUM SULFITE SLURRIES

BACKGROUND OF THE INVENTION

1. Field of the Invention

The invention relates to the removal of sulfur dioxide from gas streams such as waste or flue gases, to recover the sulfur dioxide and prevent air pollution. A circulating aqueous magnesium oxide-sulfite slurry is employed to scrub the gas stream, with the resultant formation of further magnesium sulfite, and a bleed stream of aqueous slurry is withdrawn and processed in an improved manner including centrifuging under controlled conditions, to convert the aqueous slurry to clear recycle liquor and solid material which may be calcined to generate a sulfur dioxide-rich gas stream and regenerated magnesium oxide. The invention is particularly applicable to the scrubbing of waste gas streams, such as stack or flue gases from a power boiler, or other waste gases such as the tail gas from a sulfuric acid process, smelter off-gases etc. to prevent air pollution. The method of the present invention provides high efficiency separation of a wet solids cake from clear liquor by processing the aqueous slurry bleed stream in a centrifuge under controlled conditions.

2. Description of the Prior Art

In recent years, the scrubbing of waste gases such as flue or stack gases, or tail gases from chemical processes such as sulfuric acid manufacture, to remove sulfur dioxide and prevent air pollution, has assumed increasing importance. The use of aqueous magnesium oxide-sulfite or aqueous magnesium sulfite-bisulfite solutions or slurries for this purpose is generally described in U.S. Pat. applications Nos. 737,186 filed June 14, 1968 now U.S. Pat. No. 3,617,212; No. 772,547 filed Nov. 1, 1968 now U.S. Pat. No. 3,577,219, No. 14,947 filed Feb. 27, 1970 and No. 14,948 filed Feb. 27, 1970 now U.S. Pat. No. 3,622,270. Other disclosures include Chemical Processing V. 33 no. 1, issue for Jan. 1970 page 47, U.S. Pats. Nos. 3,428,420; 3,284,435; 3,273,961; 3,092,535 and 3,046,182; Canadian Pat. No. 822,001 and British Pat. No. 708,095.

SUMMARY OF THE INVENTION

In the present invention, an improved method is provided for processing the bleed stream of aqueous magnesium sulfite slurry derived from the scrubbing of gas streams with an aqueous magnesium oxide-sulfite slurry for sulfur dioxide removal. The method preferably includes initial thickening or settling of the slurry, to separate clear liquor from a thickened slurry, which is then heated to a temperature higher than 40° C. to convert the hexahydrate form of magnesium sulfite to the trihydrate form. The slurry is then passed through a centrifuge or centrifugal separator under controlled conditions, including initial total solids content in the range of 5 to 25 percent by weight, and centrifuge speed of at least 1,500 rpm, so that a wet solids cake is produced with less than 5 percent surface moisture content and the separated aqueous solution phase contains less than 1 percent residual solids.

The principal advantage of the invention is that minimum moisture content cake is produced by the centrifugal separation, and therefore the heat requirement of the subsequent dryer and calciner are reduced. In addition, the handling characteristics of the cake are improved and change at low moisture content. In addition, minimum solids remain in the mother liquor from the centrifugal filtration.

It is an object of the present invention to provide an improvement in systems for scrubbing waste gases with an aqueous magnesium oxide-sulfite slurry for sulfur dioxide removal.

Another object is to provide an improved method for centrifugally treating an aqueous magnesium sulfite slurry.

A further object is to produce a minimum moisture content cake by centrifugally processing an aqueous magnesium sulfite slurry in an improved manner.

An additional object is to recover an aqueous mother liquor with minimum solids in the centrifugal processing of a magnesium sulfite slurry.

These and other objects and advantages of the present invention will become evident from the description which follows.

DESCRIPTION OF THE PREFERRED EMBODIMENTS

The system of the present invention was developed in a laboratory semi-works scale investigation. In a general study of operating parameters, the feed to the centrifuge was an aqueous slurry containing 5 to 25 percent solids content by weight, at a pH of 7 to 9. Analysis of the slurry solid phase indicated a content of about 90 percent hydrated magnesium sulfite, 5 percent hydrated magnesium sulfate, and 5 percent magnesium oxide. The liquor phase contained about 0.4 percent sulfur dioxide as magnesium sulfite and 1.0 percent sulfur dioxide as magnesium sulfate. The centrifuged cake solids contained about 85 percent hydrated magnesium sulfite, 5 percent hydrated magnesium sulfate and 5 percent magnesium oxide, balance surface water. The mother liquor from the centrifuge contained in the range of 0.3 to 0.7 percent residual solids, and the liquor analyzed 0.3 to 0.5 percent sulfur dioxide as magnesium sulfite and 1.0 to 2.0 percent sulfur dioxide as magnesium sulfate in the liquor phase, and 50 to 70 percent hydrated magnesium sulfite, 1 to 5 percent hydrated magnesium sulfate and 20 to 50 percent magnesium oxide in the solid phase. It is important to attain minimum moisture content cake, as this affects the BTU requirements of the dryer and changes the handling characteristics of the cake, and to attain minimum solids in the mother liquor.

Following are test results obtained by varying operating parameters.

TABLE I

Effect of Feed Rate

| Feed Rate liters/minute | % Solids in feed slurry | Bowl RPM | % Moisture in Cake |
|---|---|---|---|
| 7.57 | 13.3 | 5000 | 25.0 |
| 11.0 | 13.3 | 5000 | 9.0 |
| 14.8 | 13.3 | 5000 | 7.7 |
| 16.7 | 20.0 | 6000 | 6.9 |
| 28.8 | 20.0 | 6000 | 6.5 |

TABLE II

Effect of Bowl RPM

| Feed Rate kg./min. | Bowl RPM | % Moisture in Cake | % Solids Recovery |
|---|---|---|---|
| 3.53 | 6000 | 0.5 | 99 |
| 4.27 | 5000 | 5.5 | 98 |
| 11.9 | 6000 | 5.5 | 98 |
| 11.2 | 5000 | 8.5 | 97 |
| 17.3 | 6000 | 3.0 | 97 |
| 18.2 | 5000 | 5.7 | 96 |

Table II tests were conducted with 5.23 percent solids in the feed slurry. As the centrifuge bowl rpm (revolutions per minute) decreases from 6,000 to 5,000, percent moisture increases, and percent solids recovery decreases. Hence, to attain less than 5 percent moisture, and maximum solids recovery, the bowl rpm should be greater than 5,000 under these test conditions.

TABLE III

Effect of % Solids in Feed

| Feed Rate kg./min. | % Solids in Feed Slurry | Bowl RPM | % Moisture in Cake |
|---|---|---|---|
| 17.7 | 20.0 | 6000 | 6.9 |

| 17.2 | 5.23 | 6000 | 3.0 |
| 17.2 | 13.3 | 5000 | 7.7 |
| 18.1 | 5.23 | 5000 | 5.7 |

The higher the percent solids in the feed slurry, the higher the moisture content. To obtain required moisture content, with increase in percent solids, the bowl rpm should be increased. With lower percent solids, the bowl rpm could be decreased. Thus, with 13 percent solids or higher in the feed slurry, the bowl rpm should be higher than 6,000, however with 5 to 13 percent solids in the feed slurry, the bowl rpm should be 5,000 or higher.

In an actual industrial installation, the bleed slurry drawn off from the circulating aqueous scrubbing slurry and containing solid particles of magnesium sulfite together with magnesium sulfate and magnesium oxide is passed to a thickener or settler, from which clear liquor and thickened slurry are drawn off. The thickened slurry is heated to a temperature above 40° C. to convert magnesium sulfite hexahydrate to the trihydrate form, and the resulting slurry is passed to the centrifuge.

In a large-scale installation, the bowl rpm range would be at least 1,500, or in the range of 1,500 to 3,600 rpm or up to 6,000 rpm as a maximum. The bleed slurry stream derived from waste gas scrubbing contains solids in a total proportion less than about 15 percent by weight, and generally in the range of 1 to 5 percent total solids. The aqueous slurry is passed through a thickener to produce a thickened slurry containing 5 to 25 percent solids by weight, and the thickened slurry is heated to a temperature above 40° C. and preferably in the range of 50° to 80° C., to convert magnesium sulfite hexahydrate to trihydrate form. The slurry is fed to the centrifuge at an initial total solids content in the range of 5 to 25 percent by weight, consisting principally of magnesium sulfite together with minor proportions of magnesium sulfate and magnesium oxide. A wet solids cake is produced with a surface moisture content of less than 5 percent by weight, and preferably in the range of 0.5 to 3 percent by weight. The aqueous solution phase discharged from the centrifuge contains less than 1 percent residual solids by weight, and typically contains in the range of 0.3 to 0.7 percent residual solids by weight.

I claim:

1. A method for filtering an aqueous slurry principally containing solid magnesium sulfite crystals and minor proportions of solid magnesium sulfate and solid magnesium oxide, said aqueous slurry containing said solids in a total proportion less than about 15 percent by weight and being derived from the scrubbing of a waste gas stream with a circulating aqueous magnesium oxide-sulfite slurry for sulfur dioxide removal, which comprises decanting a clear solution phase from the aqueous slurry, whereby a thickened aqueous slurry containing in the range of 5 to 25 percent total solids content is produced, heating said thickened aqueous slurry to a temperature above 40° C., whereby solid magnesium sulfite hexahydrate in said slurry is converted to magnesium sulfite trihydrate, and separating the resulting slurry into an aqueous solution phase and residual wet solids cake in centrifugal means, said resulting slurry flowing into said centrifugal separation means with an initial total solids content in the range of 5 to 25 percent, said centrifugal separation means rotating at a speed of at least 1,500 rpm, whereby said residual wet solids cake is produced with a moisture content of less than 5 percent by weight and said aqueous solution phase contains less than 1 percent solids by weight.

2. The method of claim 1, in which said thickened aqueous slurry is heated to a temperature in the range of 50° to 80° C. to convert magnesium sulfite hexahydrate to magnesium sulfite trihydrate.

3. The method of claim 1, in which said aqueous slurry initially contains in the range of 1 to 5 percent by weight of total solids content.

4. The method of claim 1, in which said centrifugal separation means rotates at a speed in the range of 1,500 to 6,000 rpm.

5. The method of claim 1, in which said residual wet solids cake is produced with a moisture content in the range of 0.5 to 3 percent.

6. The method of claim 1, in which said aqueous solution phase contains in the range of 0.3 to 0.7 percent residual solids.

* * * * *